Whitmore & Smith.
Joiner's Rule Joint.
Nº 25,460.  Patented Sept. 13, 1859.
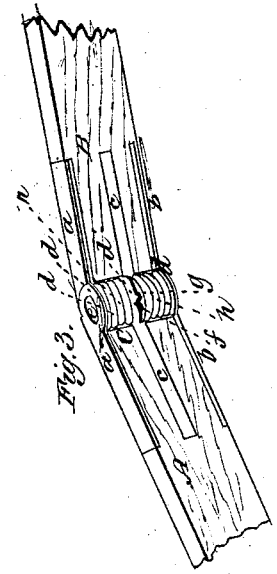
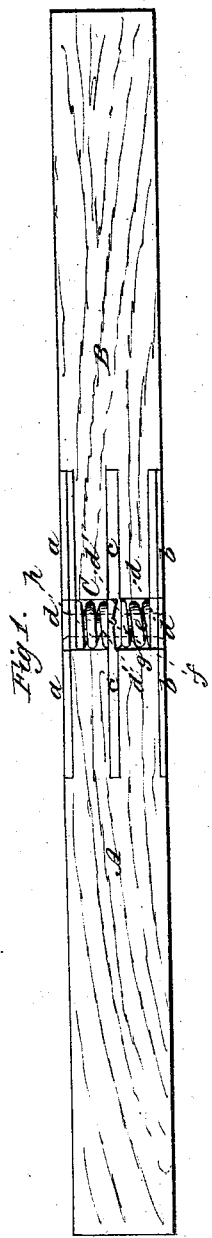
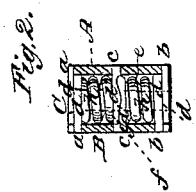
Witnesses.
B. F. Dana
Henry Barnard
Inventors.
Hamlin Whitmore
David M. Smith

UNITED STATES PATENT OFFICE.

HAMLIN WHITMORE AND DAVID M. SMITH, OF SPRINGFIELD, VERMONT.

CARPENTER'S RULE.

Specification of Letters Patent No. 25,460, dated September 13, 1859.

*To all whom it may concern:*

Be it known that we HAMLIN WHITMORE and DAVID M. SMITH, both of Springfield, in the county of Windsor and State of Vermont, have invented a new and useful Improvement in Joiners' Rules; and we do hereby declare that the following is a full, clear, and exact description of the same, reference being had to the annexed drawings, making a part of this specification, in which—

Figure 1, is an inner face view of a portion of a jointed rule the joint being open or the two parts of the rule that are connected thereby being unfolded or distended. Fig. 2, is an outer view of the joint with the two parts of the rule folded together. Fig. 3, is a perspective view of the parts disposed as shown in Fig. 1.

Similar letters of reference indicate corresponding parts in the several figures.

This invention relates to an improvement in the joints of the rule whereby the same are prevented from casually opening and closing, a result due to the wear occasioned by a very little use.

The invention consists in having spiral springs fitted on the pintles of the joints and bearing against elastic plates at the central portions of the joints, said plates being notched and provided with projections so as to form snaps or catches, substantially as hereinafter shown to effect the desired object.

To enable those skilled in the art to fully understand and construct our invention we will proceed to describe it.

A, B, represent two parts of a jointed rule such as is used by joiners and C, the joint which connects the parts. The joint C, is formed of three pairs of plates $a$, $a$, $b$, $b$, $c$, $c$, the plates $a$, $a$, $b$, $b$, being attached to the edges of the parts A, B, and the plates $c$, $c$, fitted in the center of the parts. The inner ends of all the plates are flattened so as to form circular bearing surfaces $d$, $d'$, which overlap each other and through the center of which the pintle $e$, passes. The bearing surfaces of the plates $a$, $a$, $b$, $b$, have plane surfaces the same as an ordinary joint but the bearing surfaces $d'$, of the central plates $c$, $c$, have notches $f$, and projections $g$, the notch $f$, on one plate receiving the projection $g$, on the other and thereby forming a snap or catch. The plates $c$, $c$, having a certain degree of elasticity to allow the projections $g$, to work into and out from the notches.

On the pintle $e$, spiral springs $h$, $h$, are placed, one at each side of the bearings $d'$, of the plates $c$. These springs $h$, have a tendency to keep the bearings $d'$, pressed together and the projections $g$, in the notches $f$, and the notches and projections are so placed that the parts A, B, will be retained both in an open and closed state, projections fitting in the notches when the parts are open and also when closed. This form of catch it will be seen merely prevents a casual movement of the parts A, B, for a slight force applied to the parts A, B, will remove the projections $g$, from the notches $f$, the resistance of the springs $h$, $h$, being quite readily overcome, but, still the springs being sufficiently strong to prevent a casual movement of the parts.

By this invention loose joints occasioned by wear are avoided. The joints when loose render a rule almost useless as the parts require to be kept distended by the hand in order to obtain the proper dimensions or measure of any article, thereby rendering the manipulation of the implement quite embarassing and annoying, exacting care and attention in order to obtain correct measurement.

Having thus described our invention what we claim as new and desire to secure by Letters Patent, is,

The spiral springs $h$, $h$, applied to the pintle $e$, of the joint in connection with the elastic bearings $d'$, of the plates $c$, $c$, provided with notches $f$, and projections $g$, as and for the purpose set forth.

HAMLIN WHITMORE.
DAVID M. SMITH.

Witnesses:
HENRY BARNARD,
B. F. DANA.